(12) United States Patent
Eloff et al.

(10) Patent No.: US 9,205,409 B2
(45) Date of Patent: *Dec. 8, 2015

(54) PROCESS FOR PREPARING A COBALT—CONTAINING HYDROCARBON SYNTHESIS CATALYST PRECURSOR

(75) Inventors: Cornelia Carolina Eloff, Vaalpark (ZA); Jan Van De Loosdrecht, Sasolburg (ZA); Jacobus Lucas Visagie, Sasolburg (ZA); Hendrik Van Rensburg, Fife (GB)

(73) Assignee: SASOL TECHNOLOGY (PROPRIETARY) LIMITED, Johannesburg (ZA)

( * ) Notice: Subject to any disclaimer, the term of this patent is extended or adjusted under 35 U.S.C. 154(b) by 0 days.

This patent is subject to a terminal disclaimer.

(21) Appl. No.: 14/115,823

(22) PCT Filed: Apr. 25, 2012

(86) PCT No.: PCT/IB2012/052070
§ 371 (c)(1),
(2), (4) Date: Nov. 5, 2013

(87) PCT Pub. No.: WO2012/153218
PCT Pub. Date: Nov. 15, 2012

(65) Prior Publication Data
US 2014/0080929 A1    Mar. 20, 2014

(30) Foreign Application Priority Data
May 6, 2011    (ZA) .................................. 201103330

(51) Int. Cl.
*B01J 23/00*    (2006.01)
*B01J 23/75*    (2006.01)
(Continued)

(52) U.S. Cl.
CPC .............. *B01J 23/75* (2013.01); *B01J 23/8913* (2013.01); *B01J 35/006* (2013.01);
(Continued)

(58) Field of Classification Search
CPC .. B01J 23/8913; B01J 35/006; B01J 35/1038; B01J 37/08; B01J 37/16; B01J 21/12; C10G 3/50; C10G 45/00; C10G 2/332
USPC .......................................... 502/325; 518/715
See application file for complete search history.

(56) References Cited

U.S. PATENT DOCUMENTS 4,605,676 A    8/1986    Kobylinski et al.
5,292,705 A *  3/1994    Mitchell ....................... 502/325
(Continued)

FOREIGN PATENT DOCUMENTS

WO    0139882 A1    6/2001
WO    2008104793 A2    9/2008
(Continued)

*Primary Examiner* — Colleen Dunn
*Assistant Examiner* — Haytham Soliman
(74) *Attorney, Agent, or Firm* — Fellers, Snider, Blankenship, Bailey & Tippens, P.C.

(57) ABSTRACT

A process for preparing a cobalt-containing hydrocarbon synthesis catalyst precursor includes calcining a loaded catalyst support comprising a catalyst support supporting a cobalt compound. The calcination includes subjecting the loaded catalyst support to heat treatment by heating the loaded catalyst support to a temperature, T, of at least 220° C. at a heating rate below 10° C./minute, and effecting gas flow at a space velocity of at least 9 $m^3n$/kg cobalt compound/hour over the loaded catalyst support during at least part of the heating. The cobalt-containing hydrocarbon synthesis catalyst precursor is thereby produced.

12 Claims, 1 Drawing Sheet

Figure 1:
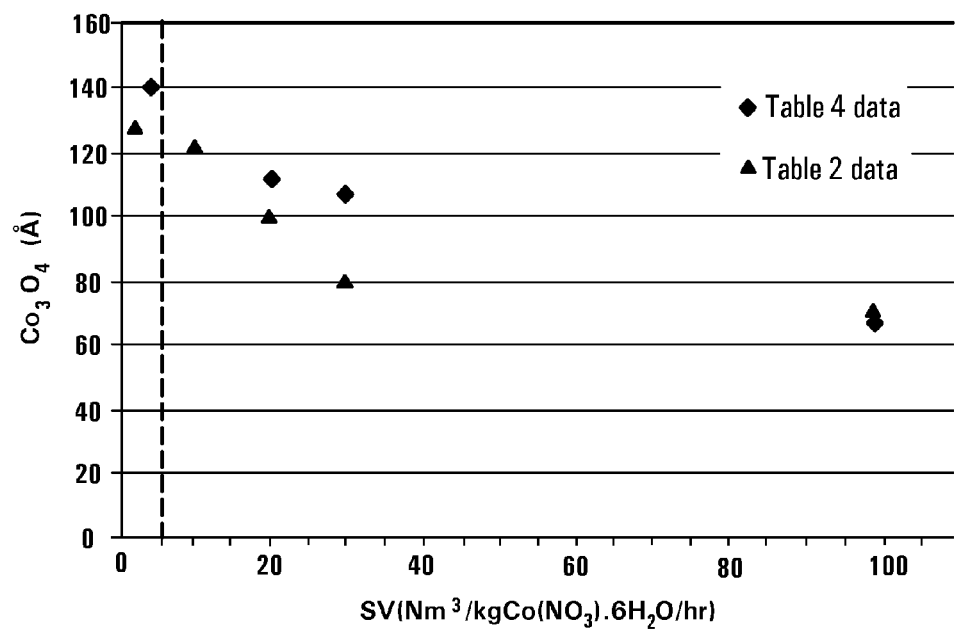

(51) Int. Cl.
*C10G 2/00* (2006.01)
*C01G 45/00* (2006.01)
*C10G 3/00* (2006.01)
*B01J 37/08* (2006.01)
*B01J 23/89* (2006.01)
*B01J 35/00* (2006.01)
*B01J 35/10* (2006.01)
*B01J 37/16* (2006.01)
*B01J 21/12* (2006.01)

(52) U.S. Cl.
CPC .............. *B01J 35/1038* (2013.01); *B01J 37/08* (2013.01); *C01G 45/00* (2013.01); *C10G 2/332* (2013.01); *C10G 3/50* (2013.01); *B01J 21/12* (2013.01); *B01J 37/16* (2013.01)

(56) References Cited

U.S. PATENT DOCUMENTS

| | | |
|---|---|---|
| 6,806,226 B2 | 10/2004 | Van Berge et al. |
| 2005/0245623 A1 | 11/2005 | Van Berge et al. |
| 2010/0152035 A1* | 6/2010 | Visagie et al. ............... 502/325 |

FOREIGN PATENT DOCUMENTS

| | | |
|---|---|---|
| WO | 2008135939 A2 | 11/2008 |
| WO | 2009127990 A1 | 10/2009 |
| WO | WO2010011332 A1 | 1/2010 |
| WO | 2010097754 A2 | 9/2010 |
| WO | PCTIB2012052070 | 8/2012 |

* cited by examiner

PROCESS FOR PREPARING A COBALT—CONTAINING HYDROCARBON SYNTHESIS CATALYST PRECURSOR

FIELD OF THE INVENTION

This invention relates to catalysts. In particular, it relates to a process for preparing a cobalt-containing hydrocarbon synthesis catalyst precursor, to a process for preparing a hydrocarbon synthesis catalyst, and to a process for producing hydrocarbons which includes using the said hydrocarbon synthesis catalyst.

BACKGROUND ART

It is known that supported cobalt containing Fischer-Tropsch synthesis (FTS) catalysts can be prepared by means of impregnation of a cobalt salt onto a catalyst support coupled with drying of the impregnated support, followed by calcination of the resultant dried impregnated support to obtain a FTS catalyst precursor. The catalyst precursor is then reduced to obtain the FTS catalyst comprising cobalt crystallites dispersed on the support.

It is also known that the manner in which the calcination step is carried out may influence the eventual activity of the catalyst. For example, WO 2010/011332 discloses a method of preparing a supported cobalt containing catalyst with homogeneously dispersed small crystallites. The method comprises depositing cobalt nitrate on a catalyst support and then heating the support in an oxygen containing, substantially water-free, atmosphere to about 160° C. to form an intermediate decomposition product. This intermediate decomposition product is then calcined and reduced to produce the catalyst with homogeneously dispersed small crystallites.

It is known (for example, from WO 2010/011332) that the activity of a cobalt containing FTS catalyst is proportional to the cobalt particle sizes above 6 nm, and accordingly it is expected that small crystallites and high dispersion thereof will result in improved activity of the catalyst.

U.S. Pat. No. 6,806,226 discloses a cobalt containing catalyst which, during the calcination step, has been calcined in such a manner that all reducible cobalt is of the formula-unit $CoO_aH_b$. It was found that catalysts so prepared had an improved activity.

It has now been found that if, in the preparation of a cobalt containing catalyst, the calcination is carried out at a space velocity above a certain value and a heating rate below a certain value according to the present invention, a catalyst with small crystallites is obtained.

DISCLOSURE OF THE INVENTION

According to a first aspect of the present invention, there is provided a process for preparing a cobalt-containing hydrocarbon synthesis catalyst precursor, which process includes calcining a loaded catalyst support comprising a catalyst support supporting a cobalt compound, the calcination including subjecting the loaded catalyst support to heat treatment by
heating the loaded catalyst support to a temperature, T, of at least 220° C. at a heating rate below 10° C./minute; and effecting gas flow at a space velocity of at least 9 m³n/kg cobalt compound/hour over the loaded catalyst support during at least part of the heating, thereby to produce the cobalt-containing hydrocarbon synthesis catalyst precursor.

Calcination

The calcination of the loaded catalyst support may involve decomposing the cobalt compound and/or causing it to react with oxygen. During calcination the cobalt compound, for example, cobalt nitrate, may be converted into a cobalt oxide, preferably a cobalt oxide selected from CoO, CoO(OH), $Co_3O_4$, $Co_2O_3$ or a mixture of one or more thereof.

It will be appreciated that the heating during calcination may extend to a temperature above 220° C., for example up to 230° C.; or 250° C.; or even 270° C.

The heating rate is preferably below 7° C./minute, preferably below 6° C./minute, preferably below 3° C./minute.

The said space velocity during calcination is preferably at least 19 m³n/kg cobalt compound/h, more preferably at least 29 m³n/kg cobalt compound/h. The said space velocity may even be as high as 98 m³n/kg cobalt compound/h.

In one preferred embodiment of the invention the space velocity of at least 9 m³n/kg cobalt compound/h is effected over the whole of the heat treatment up to 220° C. or even above 220° C.

The gas used during the calcination may be any suitable gas such as an inert gas or an oxygen containing gas. The inert gas may be nitrogen. The oxygen containing gas may be air.

The calcination may be performed in a fluidized bed calcination unit. It will be appreciated that the heating up to the temperature of at least 220° C. refers to the bed temperature in the calcination unit, i.e. to the temperature of the loaded catalyst support bed in the calcination unit.

The Catalyst Support

The catalyst support may be any catalyst support suitable for supporting thereon an active catalyst component or a precursor compound of the active catalyst component. The catalyst support is preferably suitable for use as a support in a catalyst for synthesising hydrocarbons and/or oxygenates of hydrocarbons from at least hydrogen and carbon monoxide. Preferably the catalyst is a Fischer-Tropsch (FT) synthesis catalyst. The FT synthesis catalyst may be for a process to be performed in a fixed bed reactor, slurry bed reactor or even a fixed fluidized bed reactor. Preferably the process is to be performed in a three phase slurry bed FT synthesis reactor.

The catalyst support is usually a porous support, and preferably it is also preshaped. The support preferably has an average pore diameter between 8 and 50 nanometers, more preferably between 10 and 15 nanometers. The support pore volume may be between 0.1 and 1 ml/g catalyst support, preferably between 0.3 and 0.9 ml/g catalyst support. The pre-shaped support may be a particulate support, preferably with an average particle size of between 1 and 500 micrometers, more preferably between 10 and 250 micrometers, still more particularly between 45 and 200 micrometers.

The catalyst support may comprise a catalyst support basis and optionally one or more modifying components. The catalyst support basis may be selected from the group consisting of alumina in the form of one or more aluminium oxides; silica ($SiO_2$); titania ($TiO_2$); magnesia (MgO); zinc oxide (ZnO); and mixtures thereof. Preferably the support basis is selected from the group consisting of alumina in the form of one or more aluminium oxides; titania ($TiO_2$) and silica ($SiO_2$). More preferably the support basis is alumina in the form of one or more aluminium oxides. The support basis may be a commercially available product, for example Puralox (trade name) (available from Sasol Germany GmbH).

Preferably the catalyst support includes one or more modifying components. This is particularly the case where the support basis is soluble in a neutral and/or an acidic aqueous solution, or where the support basis is susceptible to hydrothermal attack as described below.

The modifying component may comprise a component that results in one or more of the following:
(i) decreasing the dissolution of the catalyst support in an aqueous environment,
(ii) suppressing the susceptibility of the catalyst support to hydrothermal attack (especially during Fischer-Tropsch synthesis);
(iii) increasing the pore volume of the catalyst support;
(iv) increasing the strength and/or attrition and/or abrasion resistance of the catalyst support.

In a preferred embodiment of the invention the modifying component decreases the dissolution of the catalyst support in an aqueous environment and/or suppresses the susceptibility of the catalyst support to hydrothermal attack (especially during Fischer-Tropsch synthesis). Such an aqueous environment may include an aqueous acid solution and/or an aqueous neutral solution, especially such an environment encountered during an aqueous phase impregnation catalyst preparation step. Hydrothermal attack is considered to be the sintering of the catalyst support (for example aluminium oxide) during hydrocarbon synthesis, especially Fischer-Tropsch synthesis, due to exposure to high temperature and water.

The modifying component may include or consist of Si, Zr, Co, Ti, Cu, Zn, Mn, Ba, Ni, Na, K, Ca, Sn, Cr, Fe, Li, Ti, Sr, Ga, Sb, V, Hf, Th, Ce, Ge, U, Nb, Ta, W, La and mixtures of two or more thereof.

The modifying component may be selected from the group consisting of Si; Zr; Cu; Zn; Mn; Ba; La; W; Ni and mixtures of one or more thereof. Preferably the modifying component is selected from the group consisting of Si and Zr. In a preferred embodiment of the invention the modifying component is Si.

When the modifying component is Si, the silicon level in the resultant catalyst support may be at least 0.06 Si atoms per square nanometer of the catalyst support, preferably at least 0.13 Si atoms pre square nanometer of the catalyst support, and more preferably at least 0.26 Si atoms per square nanometer of the catalyst support. Preferably the upper level is 2.8 Si atoms/$nm^2$ of the catalyst support.

In one preferred embodiment of the invention the catalyst support comprises a catalyst support basis optionally including a modifying component selected from Si and Zr, and with the catalyst support basis being selected from the group consisting of alumina in the form of one or more aluminium oxides; silica ($SiO_2$) and titania ($TiO_2$). Preferably the catalyst support basis is alumina in the form of one or more aluminium oxides and preferably it includes a modifying component which is preferably selected from Si and Zr, preferably Si. In one preferred embodiment of the invention the catalyst support may be selected from alumina in the form of one or more aluminium oxides, silica ($SiO_2$), titania ($TiO_2$), magnesia (MgO), silica modified aluminium oxide, and mixtures thereof. Preferably the support is a silica modified aluminium oxide, for example the product obtainable under the trademark Siralox from Sasol Germany GmbH. Siralox is a spray-dried silica containing aluminium oxide support. The silica modified aluminium oxide support may be the product described in U.S. Pat. No. 5,045,519 which is incorporated herein by reference.

The one or more aluminium oxides may be selected from the group including (preferably consisting of) gamma alumina, delta alumina, theta alumina and a mixture of two or more thereof. Preferably the group includes, or, preferably, consists of gamma alumina, delta alumina and a mixture of gamma alumina and delta alumina. The aluminium oxide catalyst support may be that obtainable under the trademark Puralox, preferably Puralox SCCa2/150 from SASOL Germany GmbH. Puralox SCCa 2/150 (trademark) is a spray-dried aluminium oxide support consisting of a mixture of gamma and theta aluminium oxide.

The aluminium oxide is preferably a crystalline compound which can be described by the formula $Al_2O_3 \cdot xH_2O$ where $0<x<1$. The term aluminium oxide thus excludes $Al(OH)_3$, and AlO(OH), but includes compounds such as gamma, delta and theta alumina.

The Cobalt Compound Carried on the Catalyst Support

The cobalt compound may comprise a cobalt salt.

The cobalt compound may comprise an organic cobalt compound, but preferably it comprises an inorganic cobalt compound. The inorganic cobalt compound may comprise a cobalt salt, preferably cobalt nitrate, and particularly it may be $Co(NO_3)_2 \cdot 6H_2O$.

A dopant capable of enhancing the reducibility of the active catalyst component may also be provided on the catalyst support. The dopant may be in the form of a dopant compound which is a compound of a metal selected from the group including palladium (Pd), platinum (Pt), ruthenium (Ru), rhenium (Re) and a mixture of one or more thereof. The mass proportion of the metal of the dopant (especially palladium metal or platinum metal) to the cobalt may be from 0.01:100 to 3:100.

In one embodiment of the invention the cobalt compound carried on the catalyst support may be prepared by introducing the cobalt compound onto and/or into the catalyst support. The cobalt compound may be introduced onto and/or into the catalyst support by any suitable manner, but preferably it is by means of impregnation. Preferably the catalyst support is impregnated by the cobalt compound by forming a mixture of the catalyst precursor compound; a liquid carrier for the catalyst precursor compound; and the catalyst support.

The liquid carrier may comprise a solvent for the catalyst precursor compound and preferably the catalyst precursor compound is dissolved in the liquid carrier. The liquid carrier may be water.

The Catalyst Precursor

The cobalt in the catalyst precursor may be a cobalt oxide compound including an oxy hydroxyl compound. The cobalt oxide may be selected from the group consisting of CoO, CoO(OH), $Co_3O_4$, $Co_2O_3$ or a mixture of one or more thereof.

The catalyst precursor may contain cobalt at a loading of from 5 to 70 g Co/100 g catalyst support preferably from 20 to 40 g Co/100 g catalyst support, and more preferably from 25 to 35 g Co/100 g catalyst support.

The cobalt oxide compound may be in the form of particles or crystallites distributed over the support surface.

The hydrocarbon synthesis catalyst precursor may be a Fischer-Tropsch synthesis catalyst precursor.

Catalyst

According to a second aspect of the present invention, there is provided a process for preparing a hydrocarbon synthesis catalyst which includes preparing a catalyst precursor according to the first aspect of the invention and then reducing said catalyst precursor to obtain the catalyst.

The hydrocarbon synthesis catalyst may be a Fischer-Tropsch synthesis catalyst.

The catalyst precursor is preferably treated with a reducing gas to activate the catalyst precursor. Preferably, the reducing gas is hydrogen or a hydrogen containing gas. The hydrogen containing gas may consist of hydrogen and one or more inert gases which are inert in respect of the active catalyst. The hydrogen containing gas preferably contains at least 90 volume % hydrogen.

The reducing gas may be contacted with the catalyst precursor in any suitable manner. Preferably the catalyst precursor is provided in the form of a bed with the reducing gas being caused to flow through the bed of particles. The bed of particles may be a fixed bed, but preferably it is a fluidised bed and preferably the reducing gas acts as the fluidising medium for the bed of catalyst precursor particles.

The reduction may be carried out at a pressure from 0.6 to 1.5 bar(a), preferably from 0.8 to 1.3 bar(a). Alternatively the pressure may be from 1.5 bar(a) to 20 bar(a). More preferably the pressure is at about atmospheric pressure.

The reduction is preferably carried out at a temperature in excess of 25° C. above that at which the catalyst precursor will be reduced to an active form. Preferably the activation is carried out at a temperature above 150° C., and preferably below 600° C., especially where the active catalyst component is cobalt. Preferably the reduction is carried out at a temperature below 500° C., preferably below 450° C.

During activation the temperature may be varied, and preferably it is increased to a maximum temperature as set out above.

The flow of the reducing gas through the catalyst bed is preferably controlled to ensure that contaminants produced during reduction are maintained at a sufficiently low level. The reducing gas may be recycled, and preferably the recycled reducing gas is treated to remove one or more contaminants produced during reduction. The contaminants may comprise one or more of water and ammonia.

The activation may be carried out in two or more steps during which one or both of the heating rate and the space velocity of the reducing gas is varied.

In one embodiment of the invention the active catalyst may be coated by introducing a mixture of active catalyst particles and a coating medium in the form of molten organic substance, which is at a temperature $T_1$, and which sets or congeals at a lower temperature $T_2$ so that $T_2 < T_1$, into at least one mould; and at least partly submerging the mould in a cooling liquid, so as to cool the organic substance down to a temperature $T_3$, where $T_3 \leq T_2$.

Hydrocarbon Synthesis

According to a third aspect of the present invention there is provided a hydrocarbon synthesis process comprising preparing a hydrocarbon synthesis catalyst as set out above and contacting hydrogen with carbon monoxide at a temperature above 100° C. and a pressure of at least 10 bar with the said catalyst in order to produce hydrocarbons and, optionally, oxygenates of hydrocarbons.

The temperature at which the hydrogen is contacted with the carbon monoxide may be from 180° C. to 250° C., preferably from 220° C. to 230° C. The pressure at which the hydrogen is contacted with the carbon monoxide may be from 10 bar to 40 bar.

Preferably the hydrocarbon synthesis process is a Fischer-Tropsch process, more preferably a three phase Fischer-Tropsch process, still more preferably a slurry bed Fischer-Tropsch process for producing a wax product.

The hydrocarbon synthesis process may also include a hydroprocessing step for converting the hydrocarbons and, optionally, oxygenates thereof to liquid fuels and/or chemicals.

The invention extends also to products produced by the hydrocarbon synthesis process of the third aspect of the invention.

The invention will now be further described with reference to the accompanying drawing and by means of the following non-limiting examples.

In the drawings

Figure 2:
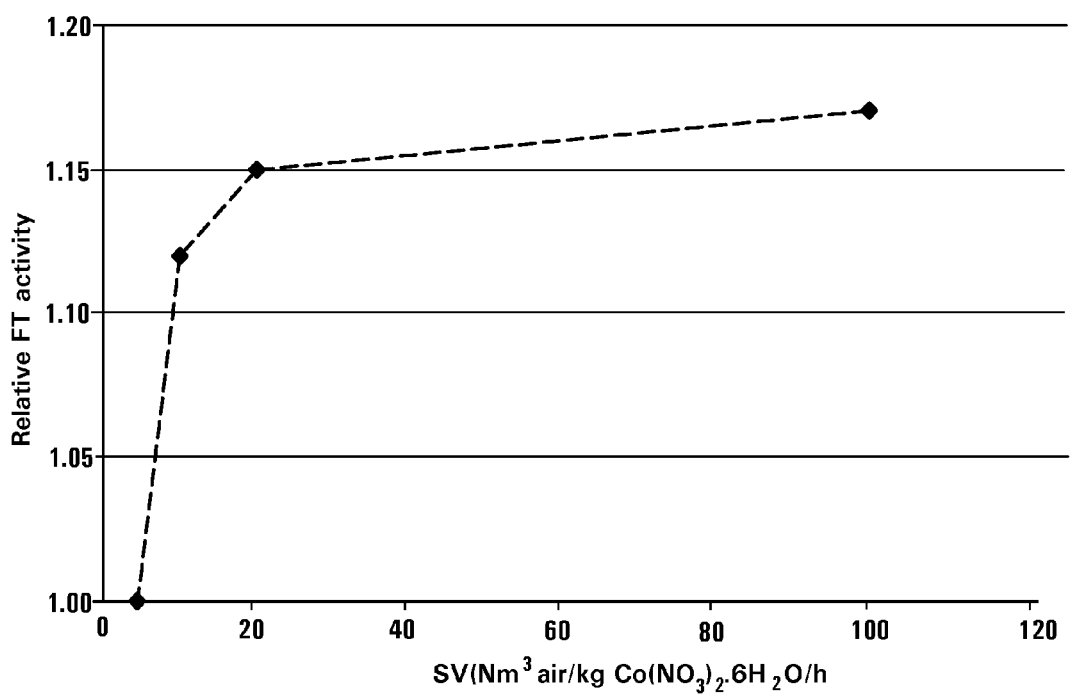

FIG. 1 shows, for Tables 2 and 4 of Example 28, a plot of cobalt crystallite size against space velocity; and FIG. 2 shows, for Table 4 of Example 28, a plot of relative FT activity against space velocity.

EXAMPLE 1 (COMPARATIVE)

C1107/1 T

A particulate supported cobalt-based or cobalt-containing Fischer-Tropsch synthesis catalyst precursor, which, on activation, produces a 16 g Co/100 g $Al_2O_3$ proprietary slurry phase Fischer-Tropsch synthesis catalyst of the Applicant, was investigated.

Cobalt Impregnation

A representative batch of this pre-reduced catalyst precursor was specifically prepared as follows: Puralox SCCa, pore volume of 0.48 ml/g, from SASOL Germany GmbH of Uberseering 40, 22297 Hamburg, Germany was modified with silicon (using TEOS in ethanol) such that the final silicon level was 1.3 mass % Si/g of support. A cobalt nitrate containing precursor (or loaded catalyst support) was prepared by slurry impregnation. 50.0 g of the above mentioned silica modified gamma alumina support was impregnated with a solution of 50.0 g $H_2O$, 39.5 g of $Co(NO_3)_2.6H_2O$ and 0.0248 g of $Pt(NH_3)_4(NO_3)_2$, and dried under increased temperature from 60 to 85° C. and vacuum from 260 to 50 mbar for 6 hours. The precursor was calcined as described below.

Calcination of Dried Cobalt Nitrate Containing Precursor

The dried precursor was loaded into a fluidised bed calcination unit. Calcination was performed at atmospheric pressure. The air flow was set at 1.97 $m^3_n$/kg $Co(NO_3)_2.6H_2O$/hour. The temperature was increased by 1° C./min from room temperature to 250° C. and held for 6 hours at 250° C. The calcined precursor, i.e. the particulate supported cobalt-containing Fischer-Tropsch synthesis catalyst precursor, was left to cool down to room temperature and unloaded.

EXAMPLE 2 (COMPARATIVE)

C1463/1 T

This example was prepared in a similar manner to Example 1.

Calcination of Dried Cobalt Nitrate Containing Precursor or Loaded Catalyst Support The precursor of this example was calcined in a similar manner to that of Example 1 except that the air flow was set at 9.87 $m^3_n$/kgCo$(NO_3)_2.6H_2O$/hour. A particulate supported cobalt-containing Fischer-Tropsch synthesis catalyst precursor in accordance with the invention was thus obtained.

EXAMPLE 3 (INVENTIVE)

C1462/1 T

This example was prepared in a similar manner to Example 1.

Calcination of Dried Cobalt Nitrate Containing Precursor or Loaded Catalyst Support The precursor of this example was calcined in a similar manner to that of Example 1 except that the air flow was set at 19.74 $m^3_n$/kg $Co(NO_3)_2.6H_2O$/hour.

EXAMPLE 4 (INVENTIVE)

C1461/1 T

This example was prepared in a similar manner to Example 1.
Calcination of Dried Cobalt Nitrate Containing Precursor or Loaded Catalyst Support The precursor of this example was calcined in a similar manner to that of Example 1 except that the air flow was set at 29.61 $m^3_n$/kg Co(NO$_3$)$_2$.6H$_2$O/hour.

EXAMPLE 5 (INVENTIVE)

C1365/1 T

This example was prepared in a similar manner to Example 1.
Calcination of Dried Cobalt Nitrate Containing Precursor or Loaded Catalyst Support The precursor of this example was calcined in a similar manner to that of Example 1 except that the air flow was set at 98.7 $m^3_n$/kg Co(NO$_3$)$_2$.6H$_2$O/hour and the heating rate was 0.5° C./min.

EXAMPLE 6 (COMPARATIVE)

C1466/1 P

A representative batch of this pre-reduced catalyst precursor was specifically prepared as follows: Puralox SCCa, pore volume of 0.48 ml/g, from SASOL Germany GmbH of Uberseering 40, 22297 Hamburg, Germany was used to prepare a 16 g Co/100 Al$_2$O$_3$ catalyst precursor in a similar manner to Example 1, except that no Si was added.
Calcination of Dried Cobalt Nitrate Containing Precursor or Loaded Catalyst Support The precursor of this example was calcined in a similar manner to that Example 1 except that the air flow was set at 9.87 $m^3_n$/kg Co(NO$_3$)$_2$.6H$_2$O/hour.

EXAMPLE 7 (INVENTIVE)

C1465/1 P

This example was prepared in a similar manner to Example 6.
Calcination of Dried Cobalt Nitrate Containing Precursor or Loaded Catalyst Support The precursor of this example was calcined in a similar manner to that of Example 1 except that the air flow was set at 19.74 $m^3_n$/kg Co(NO$_3$)$_2$.6H$_2$O/hour.

EXAMPLE 8 (INVENTIVE)

C1464/1 P

This example was prepared in a similar manner to Example 6.
Calcination of Dried Cobalt Nitrate Containing Precursor or Loaded Catalyst Support The precursor of this example was calcined in a similar manner to that of Example 1 except that the air flow was set at 29.6 $m^3_n$/kg Co(NO$_3$)$_2$.6H$_2$O/hour.

EXAMPLE 9 (COMPARATIVE)

C1456/1 M

A representative batch of this pre-reduced catalyst precursor was specifically prepared as follows: Puralox SCCa, pore volume of 0.48 ml/g, from SASOL Germany GmbH of Uberseering 40, 22297 Hamburg, Germany was modified with aqueous monosilicic acid and contained a Si load of 1.6 m %. The catalyst precursor example was prepared in a similar manner to Example 1.
Calcination of Dried Cobalt Nitrate Containing Precursor or Loaded Catalyst Support The precursor of this example was calcined in a similar manner to that of Example 1 except that the air flow was set at 9.87 $m^3_n$/kg Co(NO$_3$)$_2$.6H$_2$O/hour.

EXAMPLE 10 (INVENTIVE)

C1457/1 M

This example was prepared in a similar manner to Example 9.
Calcination of Dried Cobalt Nitrate Containing Precursor or Loaded Catalyst Support The precursor of this example was calcined in a similar manner to that of Example 1 except that the air flow was set at 19.74 $m^3_n$/kg Co(NO$_3$)$_2$.6H$_2$O/hour.

EXAMPLE 11 (INVENTIVE)

C1458/1 M

This example was prepared in a similar manner to Example 9.
Calcination of Dried Cobalt Nitrate Containing Precursor or Loaded Catalyst Support The precursor of this example was calcined in a similar manner to that of Example 1 except that the air flow was set at 29.61 $m^3_n$/kg Co(NO$_3$)$_2$.6H$_2$O/hour.

EXAMPLE 12 (INVENTIVE)

C1428/1 S

A representative batch of this pre-reduced catalyst precursor was specifically prepared as follows: Puralox SCCa, pore volume of 0.48 ml/g, from SASOL Germany GmbH of Uberseering 40, 22297 Hamburg, Germany was modified with aqueous monosilicic acid and contained a Si load of 1.9 m %. This example was prepared in a similar manner to Example 1.
Calcination of Dried Cobalt Nitrate Containing Precursor or Loaded Catalyst Support The precursor of this example was calcined in a similar manner to that of Example 1 except that the air flow was set at 98.7 $m^3_n$/kg Co(NO$_3$)$_2$.6H$_2$O/hour and that the heating rate was set at 0.5° C./min.

EXAMPLE 13 (COMPARATIVE)

C1429/1 S

This example was prepared in a similar manner to Example 12.

Calcination of Dried Cobalt Nitrate Containing Precursor or Loaded Catalyst Support The precursor of this example was calcined in a similar manner to that of Example 1 except that the air flow was set at 3.95 m$^3_n$/kg Co(NO$_3$)$_2$.6H$_2$O/hour.

EXAMPLE 14 (COMPARATIVE)

C1453/1 S

This example was prepared in a similar manner to Example 12.

Calcination of Dried Cobalt Nitrate Containing Precursor or Loaded Catalyst Support The precursor of this example was calcined in a similar manner to that of Example 1 except that the air flow was set at 9.87 m$^3_n$/kg Co(NO$_3$)$_2$.6H$_2$O/hour.

EXAMPLE 15 (INVENTIVE)

C1454/1 S

This example was prepared in a similar manner to Example 12.

Calcination of Dried Cobalt Nitrate Containing Precursor or Loaded Catalyst Support The precursor of this example was calcined in a similar manner to that of Example 1 except that the air flow was set at 19.74 m$^3_n$/kg Co(NO$_3$)$_2$.6H$_2$O/hour.

EXAMPLE 16 (INVENTIVE)

C1455/1 S

This example was prepared in a similar manner to Example 12.

Calcination of Dried Cobalt Nitrate Containing Precursor or Loaded Catalyst Support The precursor of this example was calcined in a similar manner to that of Example 1 except that the air flow was set at 29.61 m$^3_n$/kg Co(NO$_3$)$_2$.6H$_2$O/hour.

EXAMPLE 17 (INVENTIVE)

C1439/1 S

This example was prepared in a similar manner to Example 12.

Calcination of Dried Cobalt Nitrate Containing Precursor or Loaded Catalyst Support The precursor of this example was calcined in a similar manner to that of Example 1 except that the air flow was set at 98.7 m$^3_n$/kg Co(NO$_3$)$_2$.6H$_2$O/hour.

EXAMPLE 18 (COMPARATIVE)

C742/1 T

A particulate supported cobalt-based Fischer-Tropsch synthesis catalyst precursor, which, on activation, produces a 16 g Co/100 g Al$_2$O$_3$ proprietary slurry phase Fischer-Tropsch synthesis catalyst of the Applicant, was investigated.

Cobalt impregnation to obtain a precursor with 16 g Co/100 g Support.

A representative batch of this pre-reduced catalyst precursor was specifically prepared as follows: Puralox SCCa, pore volume of 0.48 ml/g, from SASOL Germany GmbH of Uberseering 40, 22297 Hamburg, Germany was modified with silicon such that the final silicon level was between 0 to 1.9 mass % Si/g of support. A cobalt nitrate containing precursor was prepared by slurry impregnation. 15 kg of the above mentioned silica modified gamma alumina support was impregnated with a solution of 15 kg distilled water, 11.9 kg of Co(NO$_3$)$_2$.6H$_2$O and 7.44 g of Pt(NH$_3$)$_4$(NO$_3$)$_2$. The temperature of this slurry was increased to 60° C. after which a pressure of 20 kPa(a) was applied. During the first 3 hours of the drying step, the temperature was increased slowly and reached 95° C. after 3 hours. After 3 hours the pressure was decreased to 3-15 kPa(a), and a drying rate of 2.5 m %/h at the point of incipient wetness was used. The complete impregnation and drying step took 9 hours, after which the treated uncalcined cobalt nitrate containing precursor (or loaded catalyst support) was unloaded. This precursor was calcined as described below:

The uncalcined cobalt nitrate containing precursor was calcined in a Torbed (trademark) fluidized bed reactor by loading the cobalt nitrate containing precursor batch into the feeder hopper. The temperature of the Torbed reactor was set at 270° C., the air flow was set at 75 m$^3$·h$^{-1}$ and the vibrator feeder speed was set at 10 kg·h$^{-1}$. After the temperature had stabilised, the valve to the vibrator feeder was opened and the cobalt nitrate precursor (at room temperature) was fed by vibration into the Torbed reactor. The heating rate for the precursor was 77° C./min up to 255° C., while the space velocity was 20 m$^3_n$/kg Co(NO$_3$)$_2$.6H$_2$O/hour. Thereafter the precursor was treated for about 14 minutes in the Torbed reactor, while the temperature increased from 255 to 270° C., with a heating rate of 1.1° C./min and a space velocity of 20 m$^3_n$/kg Co(NO$_3$)$_2$.6H$_2$O/hour. The cobalt oxide precursor or particulate supported cobalt-based Fischer-Tropsch synthesis catalyst precursor, was unloaded from the reactor hopper and cyclone hopper.

The cobalt impregnation and precursor calcination were carried out in a pilot plant. The loaded catalyst support (or treated uncalcined cobalt nitrate containing precursor), was at the temperature of the pilot plant when loaded into the feeder hopper of the Torbed reactor. The pilot plant temperature is typically in the range from 4° C. to 30° C., depending on the season and the weather, and its temperature is referred to above as 'room temperature'.

EXAMPLE 19 (COMPARATIVE)

C1675/1 S

This example was prepared in a similar manner to Example 12.

Calcination of dried cobalt nitrate containing precursor or loaded catalyst support.

The precursor of this example was calcined in a similar manner to that of Example 1 except that the air flow was set at 4.0 m$^3_n$/kg Co(NO$_3$)$_2$.6H$_2$O/hour, and the heating rate was 4.3° C./min.

EXAMPLE 20 (COMPARATIVE)

C1676/1 S

This example was prepared in a similar manner to Example 12.

Calcination of Dried Cobalt Nitrate Containing Precursor or Loaded Catalyst Support The precursor of this example was calcined in a similar manner to that of Example 1 except that the air flow was set at 10.0 m$^3_n$/kg Co(NO$_3$)$_2$.6H$_2$O/hour, and the heating rate was 5° C./min.

EXAMPLE 21 (INVENTIVE)

C1674/1 S

This example was prepared in a similar manner to Example 12.

Calcination of Dried Cobalt Nitrate Containing Precursor or Loaded Catalyst Support The precursor of this example was calcined in a similar manner to that of Example 1 except that the air flow was set at 20.0 $m^3_n$/kg Co(NO$_3$)$_2$.6H$_2$O/hour, and the heating rate was 4.5° C./min.

EXAMPLE 22 (INVENTIVE)

C1673/1 S

This example was prepared in a similar manner to Example 12.

Calcination of Dried Cobalt Nitrate Containing Precursor or Loaded Catalyst Support The precursor of this example was calcined in a similar manner to that of Example 1 except that the air flow was set at 100.0 $m^3_n$/kg Co(NO$_3$)$_2$.6H$_2$O/hour, and the heating rate was 4.7° C./min.

EXAMPLE 23 (COMPARATIVE)

C1751/1 T

This example was prepared in a similar manner to Example 1.

Calcination of Dried Cobalt Nitrate Containing Precursor or Loaded Catalyst Support The precursor of this example was calcined in a similar manner to that of Example 1 with an air flow of 4.0 $m^3_n$/kg Co(NO$_3$)$_2$.6H$_2$O/hour, and a heating rate of 5.5° C./min.

EXAMPLE 24 (COMPARATIVE)

C1750/1 T

This example was prepared in a similar manner to Example 1.

Calcination of Dried Cobalt Nitrate Containing Precursor or Loaded Catalyst Support The precursor of this example was calcined in a similar manner to that of Example 1 except that the air flow was set at 10.0 $m^3_n$/kg Co(NO$_3$)$_2$.6H$_2$O/hour, and the heating rate was 5° C./min.

EXAMPLE 25 (INVENTIVE)

C1749/1 T

This example was prepared in a similar manner to Example 1.

Calcination of Dried Cobalt Nitrate Containing Precursor or Loaded Catalyst Support The precursor of this example was calcined in a similar manner to that of Example 1 except that the air flow was set at 20.0 $m^3_n$/kg Co(NO$_3$)$_2$.6H$_2$O/hour, and the heating rate was 5° C./min.

EXAMPLE 26 (INVENTIVE)

C1748/1 T

This example was prepared in a similar manner to Example 1.

Calcination of Dried Cobalt Nitrate Containing Precursor or Loaded Catalyst Support The precursor of this example was calcined in a similar manner to that of Example 1 except that the air flow was set at 100.0 $m^3_n$/kg Co(NO$_3$)$_2$.6H$_2$O/hour, and the heating rate was 6° C./min.

EXAMPLE 27 (COMPARATIVE)

C1878/1 S

This example was prepared in a similar manner to Example 12.

Calcination of dried cobalt nitrate containing precursor or loaded catalyst support:

The precursor of this example was calcined in a similar manner to that of Example 1 except that the air flow was set at 10 $m^3_n$/kg Co(NO$_3$)$_2$.6H$_2$O/hour, and the heating rate was 8.6° C./min.

EXAMPLE 28

XRD Analyses

The calcined samples from Examples 1-27 were subjected to a powdered X ray diffraction analysis as follows:

The samples were packed into stainless steel holders. The Philips X'Pert Pro multi-purpose diffractometer (XRD-2 system) was used to do the analyses. Instrument settings were as follows:
Tube voltage: 40 kV
Tube current: 40 mA
Source Cobalt: (wavelength 1.78897 Å)
Soller slit: 0.04 rad.
Beam mask: 10 mm
Automatic divergence slit Irradiated length: 10 mm
Anti-scatter slit: 2°
Filter: Iron
Detector: X'Celerator
Scan from: 5°2θ
Scan to 105°2θ
Step size 0.0167°2θ
Time per step 150 s
Scan duration 2 hours X'Pert HighScore Plus software was used to identify the crystalline phases present in the sample. Topas was used for quantitative phase analysis using the fundamental parameter approach. The full pattern refinement technique was used to determine the average crystallite sizes. The sample adsorption was fixed at 10 cm$^{-1}$.

The average crystallite sizes are listed in Tables 1, 2, 3, 4, 5 and 6.

TABLE 1

Co$_3$O$_4$ crystallite size (Å) for samples of the composition 16 g Co/0.025 g Pt/0 g Si/100 g Al$_2$O$_3$

| Example No | Sample Name | SV (Nm$^3$ air/kg Co(NO$_3$)$_2$•6H$_2$O)/hr) | HR (° C./min) | Co$_3$O$_4$ (Å) |
|---|---|---|---|---|
| 6 (comp) | C1466/1 P | 9.87 | 1 | 90 |
| 7 | C1465/1 P | 19.74 | 1 | 82 |
| 8 | C1464/1 P | 29.61 | 1 | 60 |

TABLE 2

Co$_3$O$_4$ crystallite size (Å) for samples of the composition 16 g Co/0.025 g Pt/1.3 g Si/100 g Al$_2$O$_3$

| Example No | Sample Name | SV (Nm$^3$ air/kg Co(NO$_3$)$_2$•6H$_2$O)/hr) | HR (° C./min) | Co$_3$O$_4$ (Å) |
|---|---|---|---|---|
| 1 (comp) | C1107/1 T | 1.97 | 1 | 128 |
| 2 (comp) | C1463/1 T | 9.87 | 1 | 122 |

TABLE 2-continued

Co$_3$O$_4$ crystallite size (Å) for samples of the
composition 16 g Co/0.025 g Pt/1.3 g Si/100 g Al$_2$O$_3$

| Example No | Sample Name | SV (Nm$^3$ air/kg Co(NO$_3$)$_2$•6H$_2$O)/hr) | HR (° C./min) | Co$_3$O$_4$ (Å) |
|---|---|---|---|---|
| 3 | C1462/1 T | 19.74 | 1 | 100 |
| 4 | C1461/1 T | 29.61 | 1 | 80 |
| 5 | C1365/1 T | 98.57 | 1 | 70 |

TABLE 3

Co$_3$O$_4$ crystallite size for samples of the composition
16 g Co/0.025 g Pt/1.6 g Si/100 g Al$_2$O$_3$

| Example No | Sample Name | SV (Nm$^3$ air/kg Co(NO$_3$)$_2$•6H$_2$O)/hr) | HR (° C./min) | Co$_3$O$_4$ (Å) |
|---|---|---|---|---|
| 9 (comp) | C1456/1 M | 9.87 | 1 | 92 |
| 10 | C1457/1 M | 19.74 | 1 | 88 |
| 11 | C1458/1 M | 29.61 | 1 | 70 |

TABLE 4

Co$_3$O$_4$ crystallite size and relative FT activity for samples
of the composition 16 g Co/0.025 g Pt/1.9 g Si/100 g Al$_2$O$_3$

| Example No | Sample Name | SV (Nm$^3$ air/kg Co(NO$_3$)$_2$•6H$_2$O)/hr) | HR (° C./min) | Co$_3$O$_4$ (Å) | Relative FT activity* |
|---|---|---|---|---|---|
| 12 | C1428/1 S | 98.7 | 0.5 | 72 | |
| 13 (comp) | C1429/1 S | 3.95 | 1 | 140 | 1.00 |
| 14 (comp) | C1453/1 S | 9.87 | 1 | 120 | 1.12 |
| 15 | C1454/1 S | 19.87 | 1 | 112 | 1.15 |
| 16 | C1455/1 S | 29.61 | 1 | 108 | |
| 17 | C1439/1 S | 98.7 | 1 | 68 | 1.17 |

*Error in data is 5%. FT activity is expressed relative to Example 13.

TABLE 5

Co$_3$O$_4$ crystallite size (Å) for samples of the
composition 16 g Co/0.025 g Pt/1.9 g Si/100 g Al$_2$O$_3$

| Example No | Sample Name | SV (Nm$^3$ air/kg Co(NO$_3$)$_2$•6H$_2$O)/hr) | HR (° C./min) | Co$_3$O$_4$ (Å) |
|---|---|---|---|---|
| 19 (comp) | C1675/1 S | 4.0 | 4.3 | 150 |
| 20 (comp) | C1676/1 S | 10.0 | 5.0 | 120 |
| 21 | C1674/1 S | 20.0 | 4.5 | 120 |
| 22 | C1673/1 S | 100 | 4.7 | 70 |

TABLE 6

Co$_3$O$_4$ crystallite size (Å) for samples of the
composition 16 g Co/0.025 g Pt/1.3 g Si/100 g Al$_2$O$_3$

| Example No | Sample Name | SV (Nm$^3$ air/kg Co(NO$_3$)$_2$•6H$_2$O)/hr) | HR (° C./min) | Co$_3$O$_4$ (Å) |
|---|---|---|---|---|
| 23 (comp) | C1751/1 T | 4.0 | 5.5 | 130 |
| 24 (comp) | C1750/1 T | 10.0 | 5.0 | 100 |
| 25 | C1749/1 T | 20.0 | 5.0 | 90 |
| 26 | C1748/1 T | 100 | 6.2 | 60 |

The data of Tables 2 and 4 are also represented in FIG. 1. It can clearly be seen from FIG. 1 that the cobalt crystallite size is smaller for catalyst prepared according to the invention, i.e. using a space velocity in excess of 9 m$^3$n/kg Co(NO$_3$)$_2$.6H$_2$O/hour, while the heating rate is less than 10° C./min. Smaller cobalt crystallites would give higher FT activities and thus better FT performance.

Tables 5 and 6 show that smaller cobalt crystallites are also obtained using a space velocity in excess of 9 Nm$^3$ air/kg Co(NO$_3$)$_2$.6H$_2$O/hr when using a heating rate of around 5° C./min instead of 1° C./min.

EXAMPLE 29

Fischer-Tropsch activity testing was executed for Examples 13, 14, 15, and 17 in high throughput fixed bed reactors. The reactor system was first purged with argon.

The calcined precursor was reduced in-situ in the fixed bed reactors using a H$_2$ flow of 2000 ml hydrogen/ml catalyst/h, at atmospheric pressure and the catalyst precursors were heated from room temperature to 425° C. at a rate of 1° C./minute. After 10 hours at 425° C., the reactor was cooled down under hydrogen to 190° C. At 190° C., the reactors were pressurized to 15 bar$_a$ with argon.

Fischer-Tropsch synthesis was started using a syngas space velocity of 35 000 ml/ml catalyst/h, while water was co-fed achieving 3 bar of water vapour in the inlet feed gas stream. After 30 minutes, the reactor temperature was increased to 230° C. at a heating rate of 0.25° C./min. After reaching 230° C., the gas flows and water addition were adjusted to reach a CO conversion of 22-25%.

The Fischer-Tropsch activity data were expressed relative to Example 13 and are shown in Table 4. The activity data are also presented in FIG. 2. From these data it can be seen that when increasing SV>9 Nm$^3$ air/kg Co(NO$_3$)$_2$.6H$_2$O/hr (while keeping the heating rate below 10° C./min) the FT activity is enhanced.

EXAMPLE 30

The particle size distribution of the catalyst precursor samples after the calcination step was analyzed by means of a commercially available Saturn DigiSizer™ 5200. This was done for Examples 15, 18 and 27.

The percentage of fine material smaller than 45 micron in the catalyst precursor is presented in Table 7.

TABLE 7

Percentage of fines (%) and Co$_3$O$_4$ crystallite size
(Å) in catalyst precursors, for Examples 15 and 18.

| Example No | Sample Name | SV (Nm$^3$ air/kg Co(NO$_3$)$_2$•6H$_2$O)/hr) | HR (° C./min) | Fines < 45 μm (%) | Co$_3$O$_4$ (Å) |
|---|---|---|---|---|---|
| 15 (inv) | C1454/1 S | 20 | 1 | 1.1 | 112 |
| 27 (comp) | C1878/1 S | 10 | 8.6 | 1.2 | 100 |
| 18 (comp) | C742/1 T | 20 | 77 | 12.4 | 88 |

As can be seen from Table 7, if a calcination process is employed with a high space velocity (e.g. 20 Nm$^3$ air/kg Co(NO$_3$)$_2$.6H$_2$O)/hr, examples 15, 18 and 27) it results in relatively small cobalt oxide crystallites (i.e. 112, 88 and 100 Å respectively), and thus a catalyst with a high FT activity. However, if a heating rate is used that is too high (e.g. 77° C./min in Example 18) it results in catalyst break-up (i.e. 12.4% fines smaller than 45 micron), while keeping the heating rate low enough prevents the catalyst break-up, but still ensures a small crystallite size and a high FT activity.

The invention claimed is:

1. A process for preparing a cobalt-containing hydrocarbon synthesis catalyst precursor, which process includes calcining a loaded catalyst support comprising a catalyst support supporting a cobalt salt, the calcination involving decomposing the cobalt salt and/or causing the cobalt salt to react with oxygen, the calcination converting the cobalt salt into a cobalt oxide, and the calcination including subjecting the loaded catalyst support to heat treatment by heating the loaded catalyst support to a temperature, T, of 220° C. at a heating rate below 10° C./minute; and effecting gas flow at a space velocity of at least 19 $m^3n/kg$ cobalt salt/hour over the loaded catalyst support during at least part of the heating to the temperature T of 220° C., thereby to produce the cobalt-containing hydrocarbon synthesis catalyst precursor.

2. The process according to claim 1 wherein, during the heat treatment, the heating is extended to a temperature above 220° C., and up to 250° C.

3. The process according to claim 1 wherein, during the heat treatment, the heating rate is below 6° C./minute.

4. The process according to claim 1, wherein the space velocity at which the gas flow is effected over the loaded catalyst support during the at least part of the heating, is at least 29 $m^3n/kg$ cobalt salt/hour.

5. The process according to claim 4, wherein the space velocity at which the gas flow is effected over the loaded catalyst support during the at least part of the heating, is up to 98 $m^3n/kg$ cobalt salt/hour.

6. The process according to claim 1, wherein the space velocity of at least 19 $m^3n/kg$ cobalt salt/hour is effected over the whole of the heat treatment up to the temperature T.

7. The process according to claim 1, wherein the gas used during the calcination is air.

8. The process according to claim 1, wherein the calcination is performed in a fluidized bed calcination unit.

9. A process for preparing a hydrocarbon synthesis catalyst which includes preparing a catalyst precursor according to claim 1 and then reducing said catalyst precursor, to obtain the catalyst.

10. The process according to claim 9, wherein the hydrocarbon synthesis catalyst is a Fischer-Tropsch synthesis catalyst.

11. A hydrocarbon synthesis process comprising preparing a hydrocarbon synthesis catalyst as claimed in claim 9 and contacting hydrogen with carbon monoxide at a temperature above 100° C. and a pressure of at least 10 bar with the catalyst in order to produce hydrocarbons and, optionally, oxygenates of hydrocarbons.

12. The process according to claim 11, which includes a hydroprocessing step for converting the hydrocarbons and, optionally, oxygenates thereof to liquid fuels and/or chemicals.

* * * * *